April 4, 1961  S. V. POLEVOY  2,978,201

FISHING REEL

Filed Oct. 22, 1958

*INVENTOR.*
STEPHEN V. POLEVOY
BY *John P. Chandler*
HIS ATTORNEY.

United States Patent Office 2,978,201
Patented Apr. 4, 1961

2,978,201
FISHING REEL
Stephen V. Polevoy, Santa Ana, Calif.
(2212 A St., San Diego 2, Calif.)
Filed Oct. 22, 1958, Ser. No. 768,917
7 Claims. (Cl. 242—84.54)

This invention relates to fishing reels and relates more particularly to a novel reel having means for driving the spool at two different speeds. An important object of the invention is to provide an improved two-speed transmission for fishing reels which requires so little space as to only slightly increase the overall dimensions of the reel and which permits the adjustment from one speed to the other to be effected by a slight movement of the thumb or forefinger of the operator.

Another object of the invention is to provide a simplified variable gear train construction wherein a gear plate is slidably mounted in one end frame of the reel and the gears journalled thereon are readily intermeshed with a pinion on the spool shaft.

Figure 1:
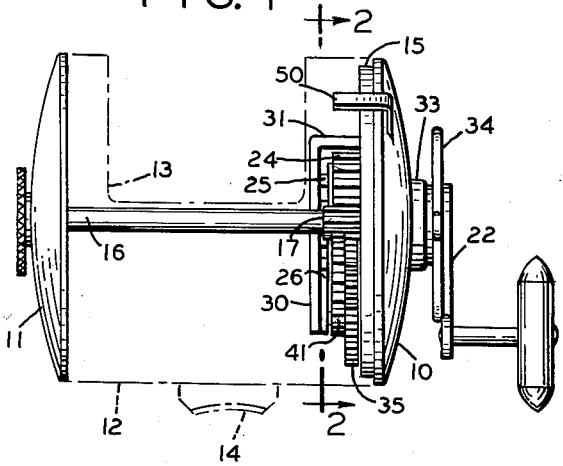
Fig. 1 is a front elevation of a fishing reel embodying the present invention, parts of the reel housing being broken away or indicated in broken lines to show the internal gear arrangement.

The housing for the reel of the present invention includes side plates 10 and 11 joined by a generally cylindrical frame structure shown in broken lines at 12 in Fig. 1 and having cut away section shown at 13 and extending on both sides of the reel axis when viewed from the top. A reel stand 14 carried on the lower central portion of the cylindrical frame is secured on the fishing rod in the usual fashion. Side plates 10 and 11 may have flat inner faces and spherical outer faces and side plate 10 is shown in Fig. 1 as having an annular recess 15 to receive the end of the cylindrical housing and end wall 11 may be similarly constructed. A spool (not shown) is keyed to a hollow shaft 16 and a driven pinion 17 is fast thereon. The side plates are maintained in their spaced relation by a fixed shaft 18 positioned within and forming a bearing for the hollow shaft and the opposed ends of the fixed shaft are threaded and are received in threaded openings in the side plates. The foregoing structure is largely conventional and forms no part of the present invention.

Figure 2:
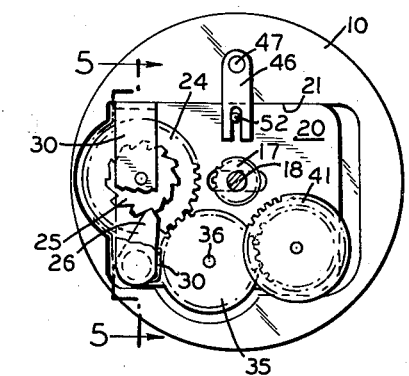
Fig. 2 is a section taken on line 2—2 of Fig. 1 and showing the neutral position of the shiftable gear mounting plate.

A flat gear plate 20 is slidably mounted in a recess 21 on the inner face of side plate 10, the distance from the top to the bottom of the recess when viewed as in Fig. 2 being such as to provide a snug though sliding fit for the gear plate. The length of the recess is greater than the length of the plate to permit the required sliding movement to allow either one of two gears to mesh with pinion 17. This distance will generally be less than one-quarter inch.

A handle or crank 22 is mounted on a main drive shaft whose reduced inner terminal section is shown at 23. A main drive gear 24 is keyed to this shaft as is a ratchet wheel 25 engaged by a pawl 26 urged by a spring 30 to prevent reverse rotation of the drive shaft. The pawl is mounted on the inner face of a bridge 30 having an L-shaped extension 31 secured to plate 20. A bushing 32 connects the other end of the bridge to plate 20 and the bridge and the plate provide two spaced bearings for shaft 23. The shaft passes through an external boss or bushing 33 fast on side plate 10. A spider 34 can be rotated and forms part of a star-drag or braking mechanism which puts varying degrees of tension, depending on the setting of the spider, on the fisherman's line. This is conventional.

An idler gear 35 freely carried on a stub shaft 36 mounted on the gear plate is slightly smaller than drive gear 24 and is constantly engaged thereby. This idler in turn meshes with a pinion 40 which, together with a cluster gear 41 is freely carried on a second stub shaft 42.

Plate 20 has an elongated slot 45 for fixed shaft 18 and is long enough to permit the plate to shift its required distance of travel. Also, side plate 10 and bushing 33 have aligned openings (not shown) of sufficient size to permit shaft 23 to move therein as the plate is shifted. The gear plate is confined along one side thereof for sliding movement within recess 21 by a small finger 44 secured by a screw 49. When the plate is to be removed the screw can be loosened and the finger swung out of the way. Along its opposite edge plate 20 is confined within the recess by a link 46 keyed to a shaft 47 journalled in the side plate and extending to its outer face where an angular shift lever 50 is keyed. The free end of the link or lever has a slot 51 which receives a pin 52 carried in fixed relation on plate 20.

It will be noted that recess 21 has several extensions to accommodate the several gears. These gears may have the straight teeth shown or they may have a helical arrangement. They may be made from metal or from suitable plastic.

Figure 3:
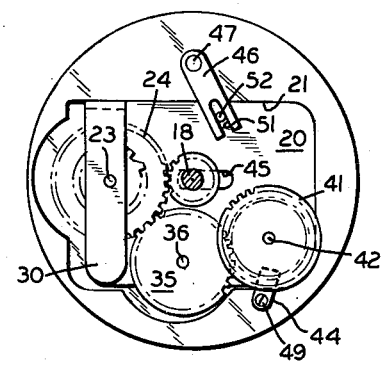
Fig. 3 is a view similar to Fig. 2 but shows a second position of the gear plate.
Figure 4:
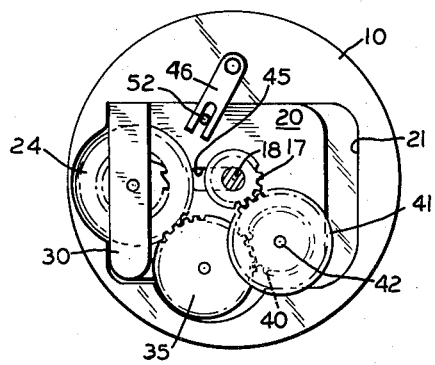
Fig. 4 shows a third position thereof.
Figure 5:
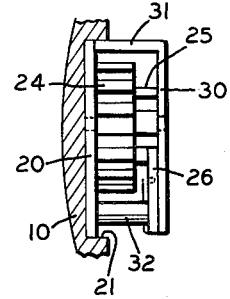
Fig. 5 is a broken section taken on line 5—5 of Fig. 2.

It will be seen from the foregoing that when the shift lever 50 is in its central or neutral position (Fig. 2) neither drive gears 24 nor 41 engage driven pinion 17 associated with the spool. In this position the spool can turn freely in either direction. When the bearing plate is shifted to the left as in Fig. 3 main drive gear 24 engages the pinion and rotation of the handle causes the spool to turn at "low" speed. When the plate is shifted to the right (Fig. 4) gear 41 meshes with pinion 17 imparting increased speed to the spool.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim:

1. In a fishing reel having a frame, side plates, and a spool journalled in the frame with a driven pinion fast to said spool, the combination of a shiftable gear train including a gear plate mounted for sliding movement on one side plate and plural shafts journalled in the gear plate including a manually rotatable drive shaft and a first drive gear fast on said shaft, a second drive gear and a connected pinion on a second shaft, and an idler gear on a third shaft and meshing with the first gear and the connected pinion, movement of the gear plate causing either drive gear to engage the driven pinion.

2. In a fishing reel having a frame, side plates, and a spool journalled in the frame with a driven pinion fast to said spool, the combination of a shiftable gear train including a gear plate mounted for sliding movement on one of the side plates, and plural shafts journalled in the gear plate including a drive shaft provided with a manually rotatable handle and a first drive gear fast on said drive shaft, a second drive gear and a connected pinion on a second shaft, and an idler gear on a third shaft and meshing with the first gear and the connected pinion, the drive gears being selectively engageable with the driven pinion on movement of the gear plate to either one of two positions.

3. In a fishing reel having a frame, side plates, and a spool journalled in the frame with a driven pinion fast to said spool, the combination of a shiftable gear train including a gear plate mounted for sliding movement on one of the side plates, stop means limiting said movement in two extreme positions, and plural shafts journalled in the gear plate including a drive shaft provided with a manually rotatable handle and a first drive gear fast on said drive shaft, a second drive gear and a connected pinion on a second shaft, and an idler gear on a third shaft and meshing with the first gear and the connected pinion, the drive gears being selectively engageable with the driven pinion on movement of the gear plate to either one of said two extreme positions and being free of engagement therewith when in an intermediate position.

4. In a fishing reel having a frame and connected side plates, and a spool provided with a driven pinion fast thereon mounted for rotation in the frame, the combination of a gear plate slidably mounted on one side plate, a drive shaft journalled in the gear plate and extending through said one side plate, a main drive gear fast on said drive shaft and engageable with the driven pinion when the gear plate is in one position, a pair of stub shafts carried by the gear plate, a second drive gear on one of said stub shafts which is engageable with the driven pinion when the gear plate is in a second position, a pinion fast on said second drive gear, and an idler gear on a second stub shaft meshing with the main drive gear and the latter pinion, whereby movement of the gear plate will cause the second drive gear to engage the driven pinion.

5. In a fishing reel having a frame and side plates connected by a fixed shaft, and a spool provided with a driven pinion fast thereon mounted for rotation on the fixed shaft, the combination of a shiftable gear plate slidably mounted on one side plate, a drive shaft journalled in the gear plate and extending through said latter side plate, a main drive gear fast on said drive shaft and engageable with the driven pinion when the gear plate is in one position, a pair of stub shafts carried by the gear plate, a second drive gear on one of said stub shafts which is engageable with the driven pinion when the gear plate is in a second position and a pinion fast on said second drive gear, and an idler gear on a second stub shaft meshing with the main drive gear and the latter pinion.

6. In a fishing reel having a frame and side plates connected by a fixed shaft, and a spool provided with a driven pinion fast thereon mounted for rotation on the fixed shaft, the combination of a shiftable gear plate mounted on one side plate, said one side plate having a recess to receive the gear plate in sliding relation, a drive shaft journalled in the gear plate and extending through said latter side plate, a main drive gear fast on said drive shaft and engageable with the driven pinion when the gear plate has been shifted to one position, a pair of stub shafts carried by the gear plate, a second drive gear on one of said stub shafts which is engageable with the driven pinion when the gear plate is in a second position, a pinion fast on said second drive gear, and an idler gear on a second stub shaft meshing with the main drive gear and the latter pinion, and a shift lever to move the gear plate to either end of said positions.

7. In a fishing reel having a frame and side plates connected by a fixed shaft, and a spool provided with a driven pinion fast thereon mounted for rotation on the fixed shaft, the combination of a shiftable gear plate mounted on one side plate, said one side plate having a recess to receive the gear plate in sliding relation, the opposed ends of said recess limiting travel of the gear plate in two directions, a drive shaft journalled in the gear plate and extending through said one side plate, a main drive gear fast on said drive shaft and engageable with the driven pinion when the gear plate is in one extreme position, a pair of stub shafts carried by the gear plate, a second drive gear on one of said stub shafts which is engageable with the driven pinion when the gear plate is in a second extreme position, a pinion fast on said second drive gear, an idler gear on a second stub shaft meshing with the main drive gear and the latter pinion, and a shift lever to move the plate to said extreme positions and to an intermediate position wherein the driver pinion and spool are freely rotatable.

References Cited in the file of this patent
UNITED STATES PATENTS
2,321,820     Kachel     June 15, 1943